C. E. ANDERSON.
MAP.
APPLICATION FILED DEC. 29, 1920.
1,381,957.
Patented June 21, 1921.
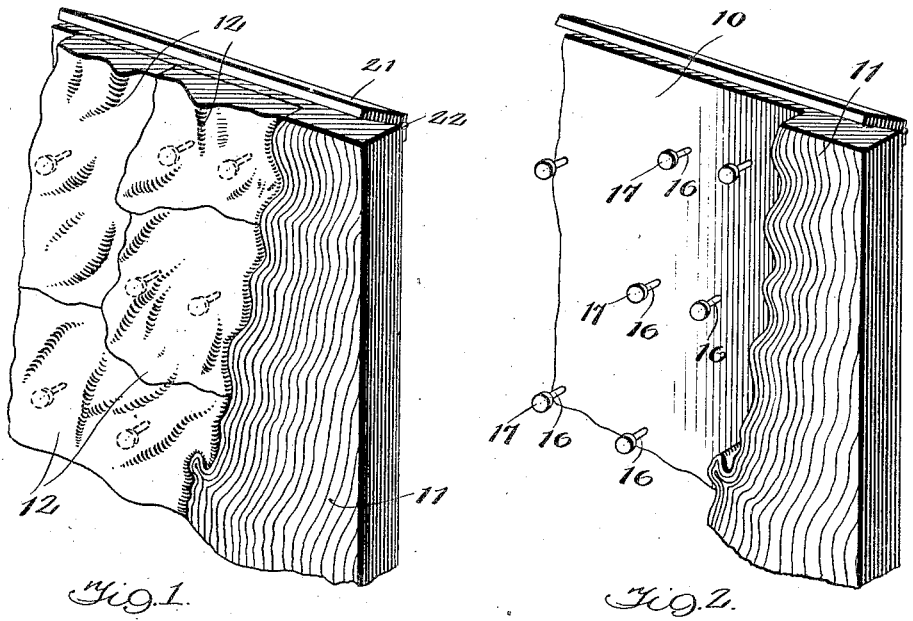
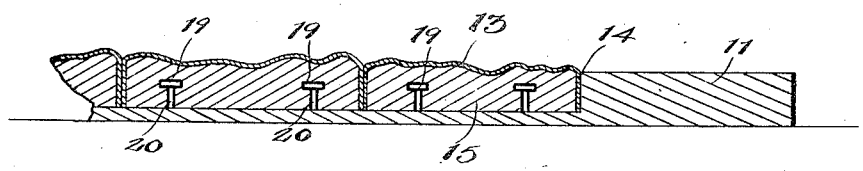
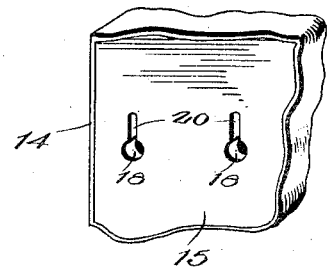
WITNESSES
INVENTOR
C. E. ANDERSON,
ATTORNEYS

UNITED STATES PATENT OFFICE.

CHARLES EDWARD ANDERSON, OF PHILADELPHIA, PENNSYLVANIA.

MAP.

1,381,957.   Specification of Letters Patent.   Patented June 21, 1921.

Application filed December 29, 1920. Serial No. 433,877.

*To all whom it may concern:*

Be it known that I, CHARLES EDWARD ANDERSON, a citizen of the United States, and a resident of Philadelphia, in the county of Philadelphia and State of Pennsylvania, have invented certain new and useful Improvements in Maps, of which the following is a specification.

The present invention relates in general to maps and more particularly to an improved intensified map especially adapted for educational purposes.

The object of the invention is to provide an improved map of this character which illustrates the topographic and geographic features of the subject of the map, which in the instance of the United States illustrates clearly the boundaries of the States and of the counties thereof and affords a means by which the proportionate size of said States and counties and of the other countries of the world may be illustrated and a means by which the main geographic and topographic features may be clearly and forcibly impressed upon the student or user of the map, and which is of simple and durable construction, of wide application, and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmenteary perspective view of a complete portion of the map;

Fig. 2 is a similar view, showing the sections representing the States, counties, countries or the like removed;

Fig. 3 is a similar view in horizontal section; and

Fig. 4 is a detail perspective view of the rear of one of the sections.

Referring to the drawings wherein for the sake of illustration is shown the preferred embodiment of the invention the numeral 10 designates a base board or body portion which may be of wood or other material and which is constructed of a size ample to receive and support the sections representing the States in the United States or countries comprehended by the map, as will be hereinafter more fully described. If a large body of water is to be represented it is preferably formed integral with the body portion or base-board in the form of a raised portion designated at 11. The exposed surface of the raised portion has delineated thereon a conventional representation of water. In fact it is proposed throughout the entire map to make use of the various devices practised in topographic drawings to supplement the physical and mechanical features of the map.

The States and counties or the countries and subdivisions thereof are each represented by a section, designated at 12, the boundary of each section corresponds to the boundary of the State, county or country which it represented, it being constructed to scale therewith. Each section consists of a sheet 13 of metal, pulp fiber or other suitable material pressed or otherwise formed to correspond to the contour of the State, county or country which it represents and having formed at its boundary a continuous depending flange 14 substantially at right angles to the mean plane of the sheet 13. As clearly shown in Fig. 3 the elevation and depression and all of the features of the contour may be clearly set forth by correspondingly forming the sheet 13. A filler block 15 of wood or other suitable material is received by the flanges 14 of each section and is secured in position therein.

Fastening means is provided for releasably and detachably securing the sections to the base-board and includes a plurality of pins or studs 16 projecting laterally from the base-board and having their outer ends headed, as designated at 17. The heads 17 are circular and are adapted to enter slots 19 formed interiorly of the filler blocks 15 of each section through circular openings 18 and to be confined in these slots 19 by being moved out of alinement with the openings 18 and into second slots 20, which communicate with the openings 18 and with the slots 19. Each second slot 20 is smaller than the first slot 19 and than the opening 18 and while ample to receive the studs 16 it serves to confine the heads 17 thereof in the slots 19 and thus lock the sections on the map when the head is moved out of alinement with the openings 18. When positioned on the board the openings 18 are preferably positioned vertically as in Fig. 4 so that gravity will tend to secure the section on the board.

At the upper end of the base-board an elongated strip or end piece 21 is arranged and is pivotally secured to the base-board by means of hinges 22. It is obvious that when the sections are assembled on the base-board the hinge piece abuts and bears against the uppermost sections and thus secures them against accidental displacement.

In practice the base-board may be utilized as a means of illustrating a variety of maps in that the sections which go to make up one map may be removed and the sections which go to make up another may be placed on the base-board. The fastening means being gravity locked automatically operate to maintain the sections on the base-board and thus when the base-board is hung on the wall or occupies a similar position the sections are locked in position against accidental displacement and at the same time any section may be readily removed to be directly compared with another section if this is considered to be feasible or desirable to illustrate proportions, similarities or dissimilarities as between different States, counties or countries.

I claim:

1. A map of the character described, comprising a base-board having an integral enlarged portion delineated to constitute a body of water, a plurality of sections corresponding to States, counties or the like, and each consisting of a sheet pressed to correspond to the contour of the State, county or country which it represents and having an outline corresponding to the boundary thereof, said sheet being provided with a depending flange around its marginal edge substantially at right angles to the mean plane of the sheet and a filler block arranged and secured in the space defined by said flange in said sheet, said filler block having slots inwardly thereof, circular openings communicating with said slots and other smaller slots communicating with said openings and with said first-named openings and a plurality of pins carried by said base-board and having heads adapted to enter said first named slots through said circular openings and to be confined in said first-named slots when said pins are also received in said last-named slots, an end piece pivoted to said base-board and engageable with said sections to prevent upward displacement of the said sections.

2. A map of the character described, comprising a base-board having an integral enlarged portion delineated to constitute a body of water, a plurality of sections corresponding to States, counties or the like and each consisting of a sheet pressed to correspond to the contours of the State, county or country which it represents and having an outline corresponding to the boundary thereof, said sheet being provided with a depending flange around its marginal edge substantially at right angles to the mean plane of the sheet and a filler block arranged and secured in the space defined by said flange in said sheet, said filler block having slots inwardly thereof, circular openings communicating with said slots and other smaller slots communicating with said openings and with said first-named openings and a plurality of pins carried by said base-board and having heads adapted to enter said first named slots through said circular openings and to be confined in said first-named slots when said pins are also received in said last-named slots.

3. A map of the character described, comprising a base-board, a plurality of sections corresponding to States, counties or the like associated with said base board, coöperating means carried by concealed portions of the sections and by the base board for securing the sections to the base board against all except upward movement and an end piece pivoted to the base board pivoted to the section to prevent upward displacement of said sections.

CHARLES EDWARD ANDERSON.